US010870117B2

(12) United States Patent
Herre et al.

(10) Patent No.: US 10,870,117 B2
(45) Date of Patent: Dec. 22, 2020

(54) NEEDLE VALVE

(71) Applicant: Dürr Systems AG, Bietigheim-Bissingen (DE)

(72) Inventors: Frank Herre, Oberriexingen (DE); Manfred Michelfelder, Höpfigheim/Steiheim (DE); Michael Baumann, Flein (DE); Rainer Melcher, Oberstenfeld (DE); Thomas Buck, Sachsenheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 15/738,586

(22) PCT Filed: Apr. 29, 2016

(86) PCT No.: PCT/EP2016/000698
§ 371 (c)(1),
(2) Date: Dec. 21, 2017

(87) PCT Pub. No.: WO2017/005334
PCT Pub. Date: Jan. 12, 2017

(65) Prior Publication Data
US 2018/0185861 A1    Jul. 5, 2018

(30) Foreign Application Priority Data
Jul. 3, 2015    (DE) .................. 10 2015 008 661

(51) Int. Cl.
*B05B 7/04*    (2006.01)
*F16K 1/38*    (2006.01)
(Continued)

(52) U.S. Cl.
CPC ............ *B05B 7/0408* (2013.01); *B05B 1/306* (2013.01); *B05B 7/1263* (2013.01); *B05B 12/14* (2013.01);
(Continued)

(58) Field of Classification Search
CPC ........ F16K 1/638; F16K 31/1221; F16K 1/38; F16K 1/385; F16K 41/10
See application file for complete search history.

(56) References Cited

U.S. PATENT DOCUMENTS 2,384,679 A    9/1945   Holtzclaw
3,463,363 A *  8/1969   Zelna .................... B05B 1/3046
                                              222/334

(Continued)

FOREIGN PATENT DOCUMENTS

CN    102022556 A    4/2011
CN    203614776 U    5/2014
(Continued)

OTHER PUBLICATIONS

International Search Report and Written Opinion for PCT/EP2016/000698 dated Aug. 8, 2016 (13 pages; with English translation).
(Continued)

*Primary Examiner* — Umashankar Venkatesan
(74) *Attorney, Agent, or Firm* — Bejin Bieneman PLC (57) ABSTRACT

The disclosure relates to a needle valve for controlling a fluid flow of a coating agent (H, SL) in a painting system, particularly for controlling a fluid flow of a two-component mixture consisting of two coating agent components (H, SL), particularly a two-component paint made from a master batch (SL) and a curing agent (H), comprising a valve seat (7) and a displaceable valve needle (7) with a needle stem and a valve head (5), wherein the valve head (5) closes the valve seat (7) in a closed position of the valve needle (7),
(Continued)

while the valve head (5) opens the valve seat (7) in an opened position of the valve needle (7). The disclosure provides a flexible membrane (18) which surrounds the valve needle (7) annularly and in a sealing manner upstream before the needle head (5).

28 Claims, 10 Drawing Sheets (51) Int. Cl.
*F16K 31/122* (2006.01)
*B05B 1/30* (2006.01)
*B05B 7/12* (2006.01)
*B05B 12/14* (2006.01)
*F16K 41/10* (2006.01)

(52) U.S. Cl.
CPC .......... *F16K 1/385* (2013.01); *F16K 31/1221* (2013.01); *F16K 41/10* (2013.01)

(56) References Cited

U.S. PATENT DOCUMENTS

| | | | |
|---|---|---|---|
| 3,589,612 A * | 6/1971 | Shaffer | B05B 7/0876 |
| | | | 239/139 |
| 3,814,328 A * | 6/1974 | Warning | B05B 7/1272 |
| | | | 239/411 |
| 3,923,252 A * | 12/1975 | Warning, Sr. | B05B 7/1272 |
| | | | 239/411 |
| 4,228,958 A * | 10/1980 | Perry | B05B 7/0815 |
| | | | 137/114 |
| 4,667,878 A | 5/1987 | Behr | |
| 5,072,885 A | 12/1991 | Hans et al. | |
| 5,462,204 A | 10/1995 | Finn | |
| 5,705,548 A * | 1/1998 | Matsuoka | C08K 5/315 |
| | | | 524/209 |
| 3,056,270 A | 5/2000 | Zimmerly | |
| 6,056,270 A * | 5/2000 | Zimmerly | F16K 1/38 |
| | | | 137/15.18 |
| 6,131,823 A | 10/2000 | Langeman | |
| 6,267,302 B1 | 7/2001 | Huffman | |
| 6,284,047 B1 | 9/2001 | Yoshida et al. | |
| 6,378,783 B1 * | 4/2002 | Ballu | B05B 1/083 |
| | | | 239/101 |
| 6,752,376 B1 | 6/2004 | Satou | |
| 7,028,976 B2 | 4/2006 | Bachmann et al. | |
| 7,275,702 B2 | 10/2007 | Nolte | |
| 9,061,310 B2 | 6/2015 | Seiz | |
| 9,126,217 B2 | 9/2015 | Nolte et al. | |
| 9,346,070 B2 | 5/2016 | Herre | |
| 9,539,594 B2 | 1/2017 | Seiz | |
| 2002/0036017 A1 | 3/2002 | Leys et al. | |
| 2002/0195505 A1 | 12/2002 | Haruch | |
| 2003/0136862 A1 * | 7/2003 | Filicicchia | B05B 7/0884 |
| | | | 239/428 |
| 2004/0238772 A1 | 12/2004 | Bachman et al. | |
| 2005/0029370 A1 | 2/2005 | Giulano | |
| 2005/0035220 A1 | 2/2005 | Brown | |
| 2005/0224513 A1 * | 10/2005 | Strong | B05B 1/306 |
| | | | 222/1 |
| 2006/0038154 A1 | 2/2006 | Fukano et al. | |
| 2010/0133353 A1 | 6/2010 | Herre | |
| 2010/0308134 A1 | 12/2010 | Bunnell | |
| 2011/0076411 A1 | 3/2011 | Nussbaum | |
| 2011/0079618 A1 * | 4/2011 | Chastine | B05C 5/0237 |
| | | | 222/542 |
| 2012/0114849 A1 | 5/2012 | Melcher et al. | |
| 2013/0284285 A1 | 10/2013 | Reifenberger | |
| 2014/0117045 A1 | 5/2014 | Varga | |
| 2017/0291182 A1 | 10/2017 | Yoon | |
| 2018/0043381 A1 | 2/2018 | Orla-Jensen | |

FOREIGN PATENT DOCUMENTS

| | | | |
|---|---|---|---|
| CN | 204025798 U | 12/2014 | |
| DE | 2330168 A1 | 1/1975 | |
| DE | 3834674 A1 | 4/1990 | |
| DE | 19846073 A1 | 4/2000 | |
| DE | 100 14 133 A1 | 11/2000 | |
| DE | 101 19 520 A1 | 10/2002 | |
| DE | 10115472 A1 | 10/2002 | |
| DE | 10139534 A1 | 2/2003 | |
| DE | 10212601 A1 | 10/2003 | |
| DE | 69827611 T2 | 11/2005 | |
| DE | 10 2005 033 191 A1 | 2/2006 | |
| DE | 10 2006 048 037 A1 | 4/2008 | |
| DE | 20 2008 017 338 U1 | 5/2009 | |
| DE | 102009020064 A1 | 11/2010 | |
| DE | 102009037604 A1 | 2/2011 | |
| DE | 10 2010 011 064 A1 | 9/2011 | |
| DE | 102010019771 A1 | 11/2011 | |
| DE | 10 2014 012 705 A1 | 3/2016 | |
| EP | 0108929 A2 | 5/1984 | |
| EP | 1063018 A1 | 12/2000 | |
| EP | 1250964 A2 | 10/2002 | |
| EP | 1 502 659 A1 | 2/2005 | |
| EP | 2254702 B1 | 5/2012 | |
| FR | 2113195 A5 | 6/1972 | |
| GB | 2373564 A | 9/2002 | |
| JP | S56-154858 U | 11/1981 | |
| JP | H09511680 A | 11/1997 | |
| JP | 2007275753 A | 10/2007 | |
| RU | 2186276 C2 | 7/2002 | |
| RU | 2450868 C2 | 5/2012 | |
| WO | 2009019036 A1 | 2/2009 | |
| WO | WO-2009019036 A1 * | 2/2009 | F16K 41/103 |
| WO | 2014066005 A1 | 5/2014 | |

OTHER PUBLICATIONS

International Search Report and Written Opinion for PCT/EP2016/001127 (10 pages; with English translation).
English translation of State Intellectual Property Office of the People's Republic of China Search Report for Patent Application No. 201680039571.3.
CIPO Office Action dated Sep. 24, 2019 for Application No. CN201680039571.3 (14 pages; with English translation).
Notification of Reasons for Rejection from Japanese Patent Office for JP2018500323 dated Feb. 18, 2020 (with English translation; 13 pages).
Non-Final Office Action dated Jun. 13, 2019 for U.S. Appl. No. 15/738,585 (20 pages).

* cited by examiner

Fig. 5C
Section A-A

Fig. 5D
Section B-B

Fig. 5E

Fig. 5F
Section C-C

Fig. 6C
Section A-A

Fig. 6D

NEEDLE VALVE

CROSS-REFERENCE TO RELATED APPLICATIONS

This application is a national stage of, and claims priority to, Patent Cooperation Treaty Application No. PCT/EP2016/000698, filed on Apr. 29, 2016, which application claims priority to German Application No. DE 10 2015 008 661.8, filed on Jul. 3, 2015, which applications are hereby incorporated herein by reference in their entireties.

The disclosure relates to a needle valve for controlling a fluid flow of a coating composition in a coating system, in particular for controlling a flow of a two-component mixture of two coating composition components (e.g. master batch and curing agent).

BACKGROUND

Two-component paints (2K paints) which consist of two components, namely a curing agent (e.g. isocyanate) and a master batch, are known. When such 2K paints are conveyed in a painting system, needle valves which have a displaceable valve needle are conventionally used as shut-off valves. The valve needle hereby extends through a valve chamber which during operation is filled with the 2K paint, the valve chamber being sealed with respect to the valve drive acting upon the valve needle by a sealing ring. The sealing ring slides with its inner side against the outer lateral surface of the valve needle and rests with its outer periphery on the inside wall of the valve chamber.

A problem here is the fact that the curing agent (e.g. isocyanate) generally reacts with water and then cures. Even extremely small amounts of water are sufficient to start the curing process, so that, for example, even normal atmospheric moisture leads to curing. This is a problem because the 2K paint or the curing agent used has very good creep properties and is of low viscosity and is therefore able to migrate beneath the sealing ring around the valve needle, so that the 2K paint or the curing agent can escape from the valve chamber filled with paint into the region of the valve drive. In particular in the case of relatively long stoppage times (e.g. at weekends), this can lead to undesired curing of the 2K paint or of the curing agent. For example, the cured 2K paint can stick the valve needle in the valve seat. In addition, the 2K paint can adhere to the valve needle and then, in the cured state, damage the surrounding sealing ring, which results in leakage. Furthermore, cured deposits in the valve seat can result in the valve no longer closing. Cured deposits can also have the result that the valve closes more slowly.

A valve failure is particularly problematic if the valve is no longer able to open, since there may then be an overpressure fault upstream of the valve, which in an extreme case can lead to bursting of the feed hoses so that 2K paint or curing agent can escape, which then involves considerable stoppage times for cleaning and repair work.

A further problem is that the 2K paints which are conventional nowadays often contain abrasive nanoparticles, which lead to premature wear of the needle seal by the sealing ring.

Finally, a chemical reaction can occur in the region of the needle tip between the medium (2K paint or curing agent) and the material of the needle tip or of the valve seat, which can likewise lead to adhesion so that the valve is no longer able to open.

DETAILED DESCRIPTION

The disclosure involves the general technical concept of not, or at least not only, sealing the valve chamber filled with media by means of a sliding sealing ring, as is the case in the prior art. Instead, the disclosure provides a flexible membrane which surrounds the displaceable valve needle upstream of the needle head in an annular and sealing manner.

Accordingly, the disclosure consists substantially of an improved needle valve for controlling a fluid flow of a coating composition in a coating system. The needle valve according to the disclosure is particularly suitable for controlling a flow of a two-component mixture which consists of two coating composition components, such as, for example, a master batch and a curing agent (e.g. isocyanate). The needle valve according to the disclosure is, however, also suitable for controlling a flow of a single coating composition, such as, for example, a curing agent (e.g. isocyanate). In addition, the needle valve according to the disclosure is also suitable generally for controlling fluid flows of coating compositions (e.g. paint) or other operating media (e.g. flushing media) in a coating system.

The needle valve according to the disclosure first has, in conformity with the prior art, a valve seat and a displaceable valve needle having a needle stem and a needle head. The valve needle is displaceable between a closed position and an open position. In the closed position, the needle head of the valve needle closes the valve seat and thereby blocks the fluid flow. In the open position, on the other hand, the valve needle is lifted from the needle head and thereby enables the fluid flow.

In a variant of the disclosure, various intermediate positions of the valve needle can continuously be set between the open position and the closed position, in order to control the fluid flow not only qualitatively (open/closed) but also quantitatively, that is to say with an adjustable flow resistance. In another variant of the disclosure, on the other hand, the needle valve controls the fluid flow only qualitatively, the fluid flow being either enabled or blocked.

The disclosure provides that the valve chamber, which surrounds the valve needle and during operation is filled with media, is sealed by a flexible membrane which surrounds the valve needle upstream of the needle head in an annular and sealing manner. The flexible membrane reliably prevents the coating composition (e.g. curing agent) from escaping from the valve chamber filled with media in the direction towards the valve drive and curing there.

In an example embodiment, the valve needle is displaceably arranged in the valve chamber, the valve chamber being cylindrical at least in part. The membrane then rests at its centre, preferably in a sealing manner, against the needle stem of the valve needle and is fixed to the needle stem of the valve needle. This means that the membrane does not slide against the valve needle but performs the movement of displacement of the valve needle between the open position and the closed position. This means that a displacement of the valve needle leads to a corresponding axial deflection of the membrane. Conversely, an axial deflection of the membrane, for example as a result of pressure acting upon one side of the membrane, leads to a corresponding displacement of the valve needle. At its peripheral edge, on the other hand, the membrane is fixed in a sealing manner to the inside wall of the valve chamber. The membrane thus permits, at the centre, an axial stroke which is at least as great as the axial distance between the closed position and the open position of the valve needle, so that the membrane does not impede the movement of the valve needle.

In one example, the needle valve has a valve drive for displacing the valve needle, wherein the valve drive can be in the form of a pneumatic valve drive having a piston, for example, which is known per se from the prior art and therefore does not have to be described in greater detail.

In addition, the needle valve according to the disclosure preferably has a coating composition inlet for supplying the coating composition (e.g. 2K paint or curing agent), wherein the coating composition inlet preferably opens into the valve chamber on the side of the membrane remote from the valve drive, so that the membrane seals the valve drive with respect to the valve chamber filled with coating composition.

The needle valve according to the disclosure may further comprise a coating composition outlet for discharging the coating composition, wherein the coating composition outlet preferably opens into the valve seat so that the coating composition is able to flow through the valve seat to the coating composition outlet when the valve needle is in the open position.

It has already been mentioned above that the needle valve according to the disclosure can have a valve drive for displacing the valve needle. In one example, the valve drive comprises a displaceable piston which acts upon the valve needle in order to displace the valve needle. The piston may be driven pneumatically. To that end, the needle valve may have a control air inlet for supplying control air, wherein the control air acts upon the piston in order to displace the piston and thus also the valve needle.

The needle valve according to the disclosure may further comprise a valve spring which acts with a spring force upon the piston or the valve needle. The valve spring on the one hand and the control air on the other hand preferably act in opposite directions.

It should further be mentioned that the spring force of the valve spring may be at least 20 N, 40 N or at least 80 N and/or not more than 400 N, 200 N or 100 N, which preferably applies both to the closed position and to the open position of the valve spring.

In one example, the valve spring pushes the valve needle in the direction towards the closed position, whereas the control air pushes the valve needle, via the piston, in the direction towards the open position. The valve spring and the needle head may be arranged on opposite sides of the piston.

It should be mentioned here that the piston may have a relatively large piston diameter in order to generate as great an opening force as possible when moving the valve needle into the open position. It should thereby be considered that the opening force is dependent upon the effective piston area and thus also upon the piston diameter and upon the pneumatic pressure of the control air. The piston therefore may have a piston diameter of at least 5 mm, 10 mm, 15 mm, 20 mm, 25 mm, 30 mm, 32 mm or even 35 mm. The piston diameter may be sufficiently large that a sufficiently great opening force can be produced with a conventional control air pressure of less than 6 bar. This is expedient because conventional 6-bar compressed air networks are already available in most painting systems and can then also be used to actuate the needle valve according to the disclosure. In this manner, a separate compressed air network for actuating the needle valve is thus not required.

It has already been mentioned above that the valve spring preferably pushes the valve needle in the direction towards the closed position, namely with a specific closing force. The pneumatic valve drive, on the other hand, when pneumatically actuated, pushes the valve needle in the direction towards the open position with a specific opening force. The opening force of the pneumatic valve drive should thereby be greater than the closing force by a specific opening force excess so that the needle valve can reliably be opened if the needle head is adhered to the valve seat. The needle valve is therefore preferably so designed that the opening force excess is greater than 20 N, 40 N, 60 N, 80 N, 100 N, 120 N or even 180 N.

However, it is also possible, as an alternative, for the valve spring to push the valve needle in the direction towards the opening position. The control air then pushes the valve needle in the direction towards the closed position. In this example, the valve spring and the needle head are preferably arranged on the same side of the piston.

In the description of the prior art, mention has already been made at the beginning of the risk that the coating composition hoses may burst upstream of the needle valve in the case of an overpressure fault also as a result of incorrect operation or misinterpretation of the overpressure fault, as a result of which 2K paint or curing agent can escape, which then leads to longer stoppage times because the 2K paint or curing agent which has escaped cures. After bursting, there is no further overpressure fault. When the operators start the plant up again, a portion or a large part of the paint escapes from the burst hose and floods, for example, the entire hand axis region. In most cases, the fault is only discovered when several litres have already escaped and other further faults occur, for example speed fault, since the turbine waste air is no longer able to escape due to the paint. The needle valve according to the disclosure therefore may have an overpressure function which leads to automatic opening of the valve if a specific opening pressure at the coating composition inlet is exceeded. To that end, the coating composition present in the valve chamber pushes against the membrane, whereby the membrane and thus also the valve needle is pushed out of the closed position into the open position if the coating composition pressure is sufficiently great to overcome the oppositely directed force of the valve spring. The membrane therefore preferably has a membrane diameter of at least 3 mm, 6 mm or 9 mm and/or not more than 40 mm, 20 mm or 11 mm. The opening pressure of the coating composition at the coating composition inlet is then preferably at least 8 bar, 10 bar, 12 bar or at least 14 bar and/or not more than 35 bar, 18 bar or 16 bar. The closing force of the spring is thus be so adapted to the desired opening pressure and the effective cross-section of the membrane that the coating composition pressure in the valve chamber pushes the membrane and thus also the valve needle out of the closed position into the open position when the desired opening pressure is exceeded.

It should further be mentioned that the valve seat preferably narrows in the direction of flow with a specific seat angle, just as the needle head also narrows in the direction of flow with a specific head angle. In one example, the seat angle is substantially equal to the head angle. For example, the seat angle can be in the range of from 35° to 50°, just as the head angle is also preferably in the range of from 35° to 50°, which ensures optimal sealing. A larger head angle improves the flow of the medium in the needle valves according to the disclosure having an additional membrane, in which the needle strokes are small (about 1.5 mm instead of 3 mm in conventional needle valves).

In one example, an additional sealing element is installed in the needle head of the valve needle in order to seal the valve seat in the closed position. This additional sealing element can be made of a different material than the needle head of the valve needle, preference being given to the use of a resilient material, such as, for example, FFKM (perfluoro rubber). For example, the additional sealing element can be moulded onto the needle head. However, it is also possible that the sealing element is installed in the needle head, for example in an annular groove in the needle head. The needle head itself can be made, for example, of titanium or of a titanium alloy, in order that the needle head is resistant to chemically aggressive curing agents of 2K paints.

It has already been mentioned briefly above that the needle head and the valve seat may taper substantially conically in the direction of flow. The needle head can have an annular groove in which the sealing element, which has already been mentioned briefly above, can be installed. The problem can thereby arise that the closing force acting upon the valve needle is absorbed completely by the sealing element, which can then lead to mechanical overloading of and damage to the sealing element. This can be prevented if the needle head has a rigid stop and rests in the closed position with the stop on the valve seat. When the valve closes, the sealing element in the needle head is thus subjected to pressure only until the valve needle rests with its stop on the valve seat. In this manner, compression of the sealing element in the needle head as the valve closes is limited, which is beneficial for the life of the sealing element.

In one example, this stop is formed by an annular peripheral supporting surface which is located in the conical lateral surface of the needle head upstream of the sealing element. This can lead to the problem that the sealing element seals the region of the needle head downstream of the sealing element, so that this region cannot be reached by the flushing medium in a flushing operation. This problem can be solved within the context of the disclosure if the supporting surface has at least one flushing groove running axially, through which flushing medium from the valve chamber can enter the region downstream of the sealing element in the axial direction. For example, such a flushing groove can have a groove width of from 1 mm to 2 mm.

Within the context of the disclosure, it is possible that the flexible membrane sealing the valve chamber replaces the sealing ring that is present in conventional needle valves. However, it is also possible within the context of the disclosure that a conventional sealing ring which surrounds the valve needle in an annular manner and rests in a sliding manner on the lateral surface of the valve needle is present in addition to the flexible membrane for sealing.

The needle stem of the valve needle may have a diameter which can be in the range of from 2 mm to 10 mm, from 3 mm to 6 mm or from 4 mm to 5 mm. The maximum needle stroke of the valve needle, on the other hand, is preferably less than 5 mm, 3 mm, 2.5 mm, 2 mm, 1.4 mm or even less than 1 mm.

It should further also be mentioned that the application not only relates to protection for the above-described needle valve and a complete coating system having at least one such needle valve, wherein the needle valve can be arranged, for example, in a rotary atomiser, in a two-component mixer or in a two-component shut-off valve.

In addition, the disclosure also includes a metering arrangement for metering a coating composition (e.g. paint, sealing agent, adhesive, insulating material) having a membrane valve, wherein the above-described needle valve according to the disclosure having a membrane is particularly suitable as the membrane valve.

The metering arrangement according to the disclosure first has a coating composition line for carrying the coating composition. A metering pump for metering the coating composition is arranged in the coating composition line.

The expression metering pump used within the context of the disclosure means that the volume stream conveyed is independent of the pressure conditions at the entry and exit of the metering pump. For example, the metering pump can be a reciprocating piston pump, a peristaltic pump, a membrane pump, a positive displacement piston pump or a gear pump, to name only a few examples.

The metering device according to the disclosure additionally has a bypass line for bypassing the metering pump, wherein the bypass line branches from the coating composition line upstream of the metering pump and merges into the coating composition line again downstream of the metering pump.

In the bypass line there is arranged a bypass valve, which can either block or free the bypass line.

In normal metering operation, the bypass valve is closed so that no coating composition is able to flow via the bypass line.

The outlet pressure and the inlet pressure of the metering pump are normally—but not necessarily—measured by a pressure sensor. If these pressure sensors measure an uncontrolled pressure increase, the metering pump is normally switched off in order to prevent a malfunction or even bursting of a hose line.

However, if these pressure sensors were to malfunction, or if pressure sensors were not present or the set values were to be incorrectly parameterised, there could be an uncontrolled pressure increase and thus a burst hose or damage in the connected atomiser. The bypass valve therefore may be in the form of membrane valve, wherein the coating composition pressure acts upon the membrane of the membrane valve and opens it at a specific maximum pressure, whereby the maximum pressure can be, for example, approximately from 15 to 17 bar. The design of the bypass valve (the valve can also be referred to as a return valve or the like) as an own-medium-actuated membrane valve thus offers the advantage that, even if the pressure sensors fail or if the external control for the bypass valve fails, the bypass line opens automatically if required.

In addition, the bypass valve may be controllable in order to be able to free the bypass line for a flushing operation. In such a flushing operation, the above-described pressure-dependent self-opening function is of no importance. However, it is expedient likewise to be able to flush the bypass line in a flushing operation, in order to prevent the bypass valve from becoming stuck together with coating composition residues.

It should additionally be mentioned that the bypass valve is also opened temporarily in each loading operation in the case of a paint change. Thus, in the case of a paint change, the coating composition line is first flushed with flushing medium and pulsed air is optionally blown through in order to remove coating composition residues of the old coating composition. The coating composition line is then filled with the new coating composition, which is also referred to as loading. In this loading, the bypass valve is preferably likewise opened for a short time. This is advantageous because the bypass valve is thereby regularly actuated during operation so that the bypass valve is kept operable.

Overpressure relief systems, which prevent an uncontrolled pressure increase, are already known from the prior art. However, pressure relief here took place to the outside, which leads to a combination of the surroundings with the coating composition. In the disclosure, on the other hand, pressure relief take places into the system, the bypass line fluidically short-circuiting the metering pump.

It should further be mentioned that the bypass valve can be mounted on the metering pump. The metering pump may have a housing made of stainless steel, while the bypass valve can have a housing made of ordinary steel. However, it could also be made of stainless steel if required by the customer. It is expedient to produce the housing of the metering pump from stainless steel because the metering pump must work very accurately. The bypass valve, on the other hand, can be of a simpler and thus less expensive construction and therefore does not require a stainless steel housing, because ordinary steel or plastics material, for example, is sufficient. It is therefore advantageous to accommodate the metering pump and the bypass valve not in a one-piece housing but in separate housings which are simply flange-mounted on one another.

FIGS. 1A, 1B, 2 and 3 are different views of a two-component shut-off valve which can be used in a painting system to combine a curing agent H (e.g. isocyanate) and a master batch SL, wherein the flow of the master batch SL and the flow of the curing agent H can be controlled separately.

Figure 1A:
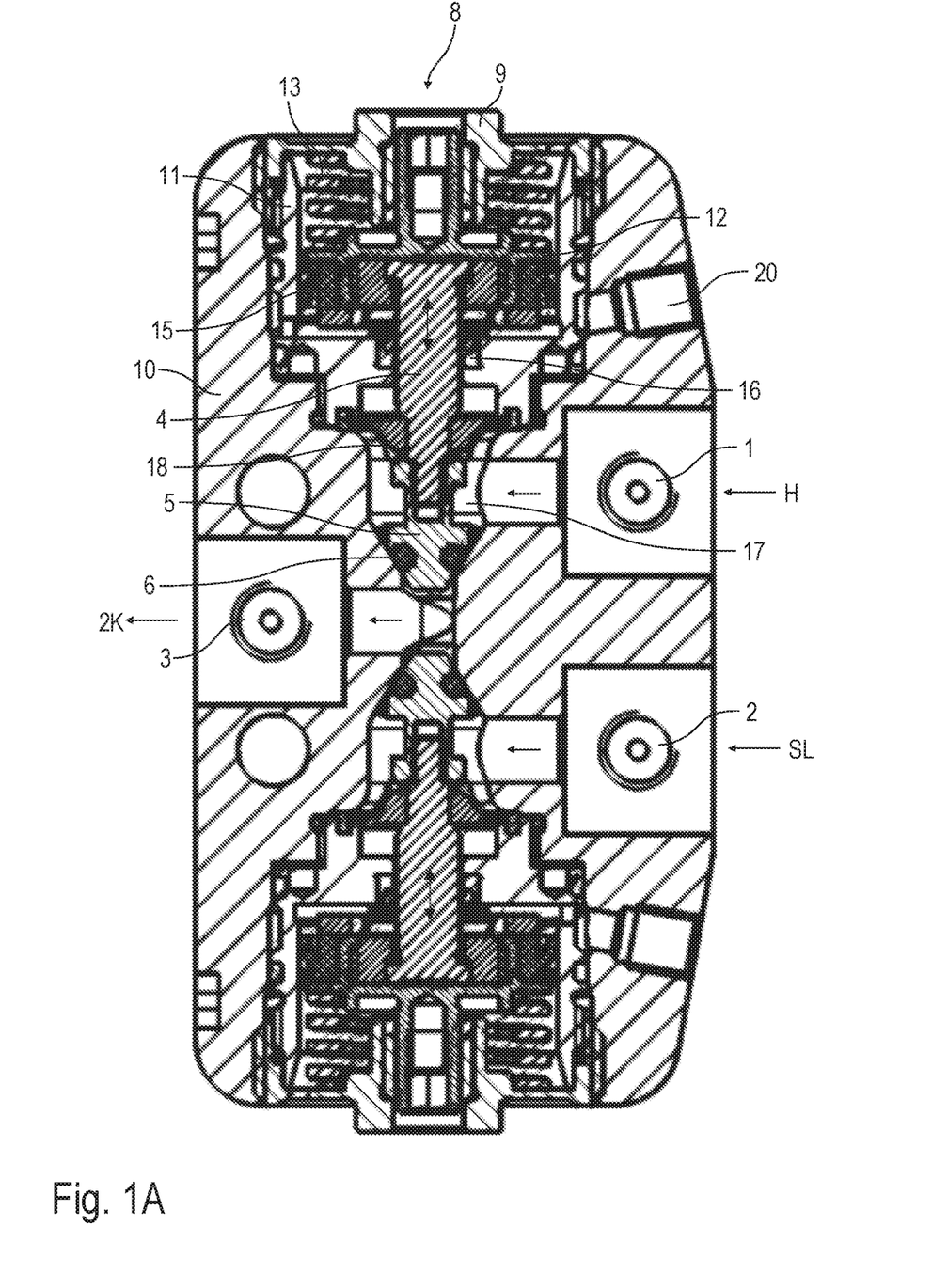
FIG. 1A is a cross-sectional view through a two-component shut-off valve according to the disclosure in a closed position.
Figure 1B:
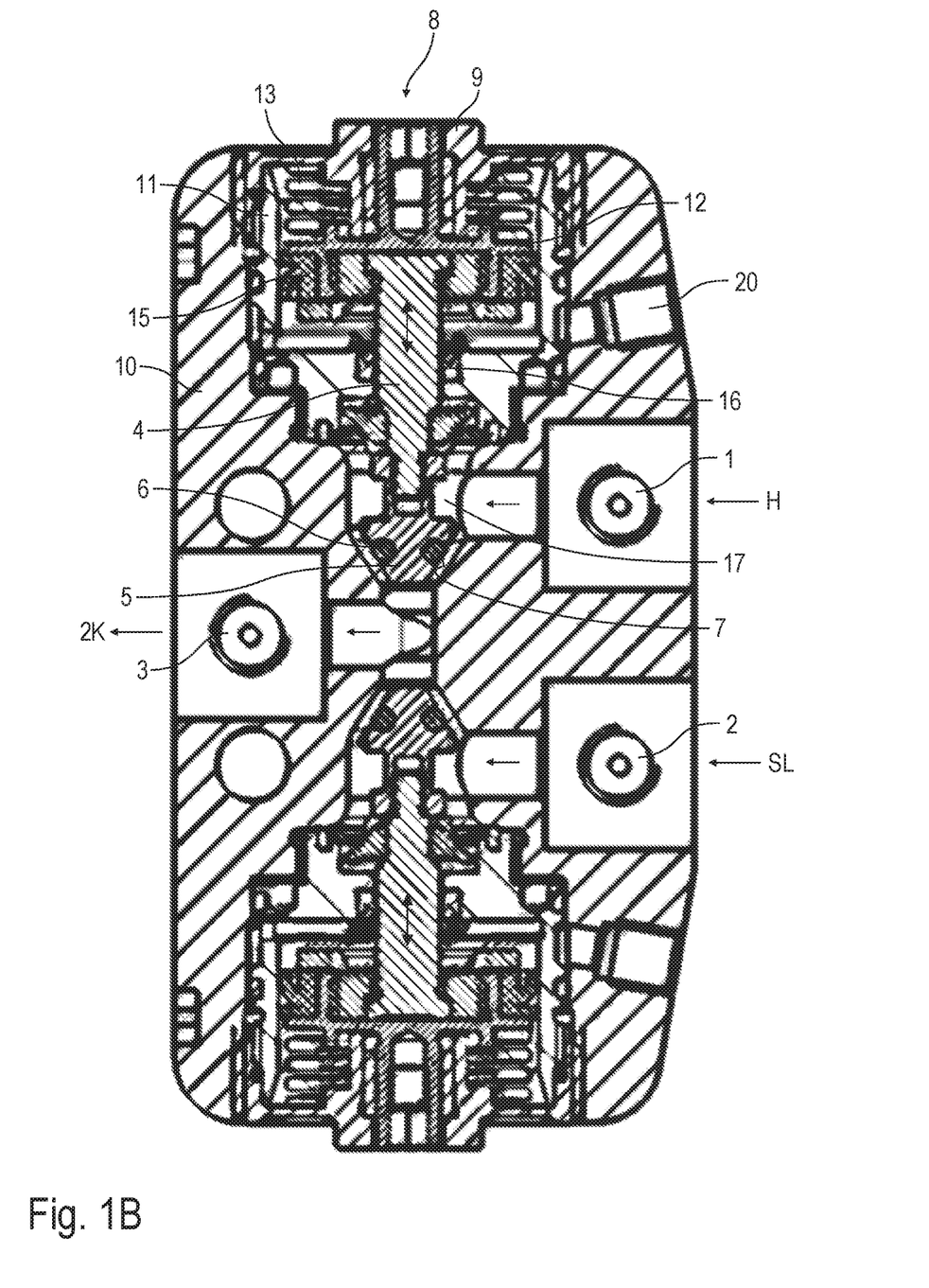
FIG. 1B is the cross-sectional view of FIG. 1A with the two-component shut-off valve in an open position.

The two-component shut-off valve has a curing agent connection 1 for supplying the curing agent H and a master batch connection 2 for supplying the master batch SL. The curing agent H and the master batch SL are combined in the two-component shut-off valve and then discharged as a preliminary mixture at an outlet 3. The master batch SL, together with the curing agent H, then conventionally enters a mixer (e.g. lattice mixer, helical mixer), which thoroughly mixes the master batch SL with the curing agent H.

The flow of the curing agent H from the curing agent connection 1 to the outlet 3 is controlled by a needle valve, which is shown in the top half in the drawings according to FIGS. 1A and 1B. The flow of the master batch SL from the master batch connection 2 to the outlet 3 is likewise controlled by a further needle valve, which is depicted in the bottom half in the drawings according to FIGS. 1A and 1B. The two needle valves for the master batch SL and the curing agent H are of the same construction and function in the same manner, so that in the following, in order to avoid repetition, only the top needle valve in the drawings, which controls the flow of the curing agent H from the curing agent connection 1 to the outlet 3, is described.

The needle valve has a displaceable valve needle 4, a needle head 5 being screwed to the distal end of the valve needle 4. The needle head 5 is made of titanium and tapers conically towards its end, an annular groove being arranged in the conically tapering lateral surface of the needle head 5, in which annular groove a sealing ring 6 of FFKM (perfluoro rubber) is installed.

In the closed position according to FIG. 1A, the needle head 5 rests in a sealing manner with the sealing ring 6 on a valve seat 7, the valve seat 7 likewise tapering conically and opening into the outlet 3.

In the open position according to FIG. 1B, on the other hand, the needle head 5 is lifted from the valve seat 7 and thereby enables the flow through the valve seat 7 to the outlet 3.

Figure 2:
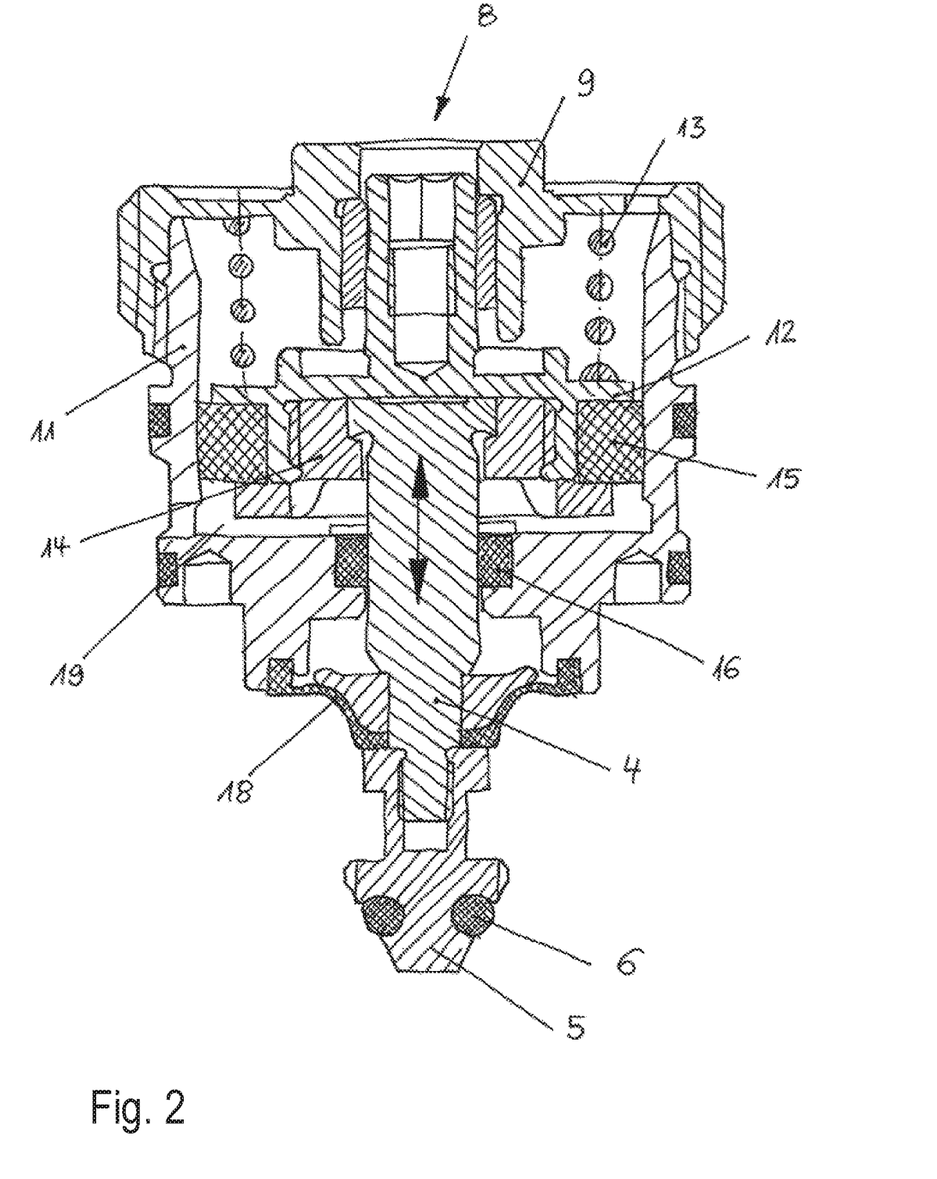
FIG. 2 is a cross-sectional view through a valve drive of the two-component shut-off valve according to FIGS. 1A and 1B.

The closed position and the open position are set by means of a valve drive 8, which is shown in detail in FIG. 2 and operates pneumatically.

The pneumatic valve drive thus has an outer housing insert 9, which is screwed into a housing body 10 of the two-component shut-off valve.

An inner housing insert 11 is in turn screwed into the outer housing inert 9.

A piston 12 is displaceably arranged in the pneumatic valve drive 8, the piston 12 being biased in the direction towards the closed position according to FIG. 1A by a valve spring 13. The valve spring 13 rests on the outer housing insert 9 and pushes at its opposite end against the piston 12 in order to push it into the closed position. The piston 12 is connected to the valve needle 4 via a piston insert 14, so that the piston 12 acts upon the valve needle 4 and thus also upon the needle head.

The piston 12 is surrounded by a sealing ring 15 which is arranged in the annular gap between the piston 12 and the inside wall of the inner housing insert 11 and slides against the inside wall of the inner housing insert 11 when the piston 12 moves.

In addition, a further sealing ring 16 is provided, which rests in a sliding manner on the lateral surface of the displaceable valve needle 4 and thus provides a further seal.

The valve needle 4 runs in part through a valve chamber 17 which during operation is filled with the respective fluid (curing agent H or master batch SL).

Between the valve drive 8 and the valve chamber 17 filled with media there is provided a flexible membrane 18 as a sealing element for sealing the valve chamber 17 with respect to the valve drive 8. The flexible membrane 18 is fixed in a sealing manner to the bottom end of the inner housing insert 11 by means of its outer peripheral edge and has in the middle a bore through which the valve needle 4 is guided. The membrane 18 is fixedly connected in a fluid-tight manner to the valve needle 4. On the one hand, the membrane 18 thus performs the movement of displacement of the valve needle 4 between the closed position and the open position. On the other hand, however, the membrane 4 also seals the valve chamber 17 filled with media with respect to the valve drive 8, no sliding movement, as in the case of a sealing ring, being required, so that there is also no risk of the curing agent H, which is of low viscosity and has good creep properties, being able to penetrate the valve drive 8.

The actual drive is effected by means of control air, which can be introduced into a control air chamber 19 beneath the piston 12, the control air in the control air chamber 19 then pushing the piston 12 upwards. The supply of control air into the control air chamber 19 takes place via a control air connection 20.

The control air can be supplied from a conventional 6-bar compressed air network, which is already present in most painting systems. This has the advantage that a separate compressed air supply is not required. The piston 12 has a relatively large effective diameter, so that the control air acting upon the piston generates a relatively great opening force. This opening force, in the case of exposure to compressed air through the control air, is greater by a specific opening force excess than the closing force which is exerted on the piston 12 by the valve spring 13. In this specific embodiment, the opening force excess is in the range of from 57.4 N to 180 N, as compared with an opening force excess of only 15 N in a conventional needle valve. This allows the needle head 5 to "break free" from the valve seat 7 even when the needle head 5 is adhered to the valve seat 7.

Figure 3:
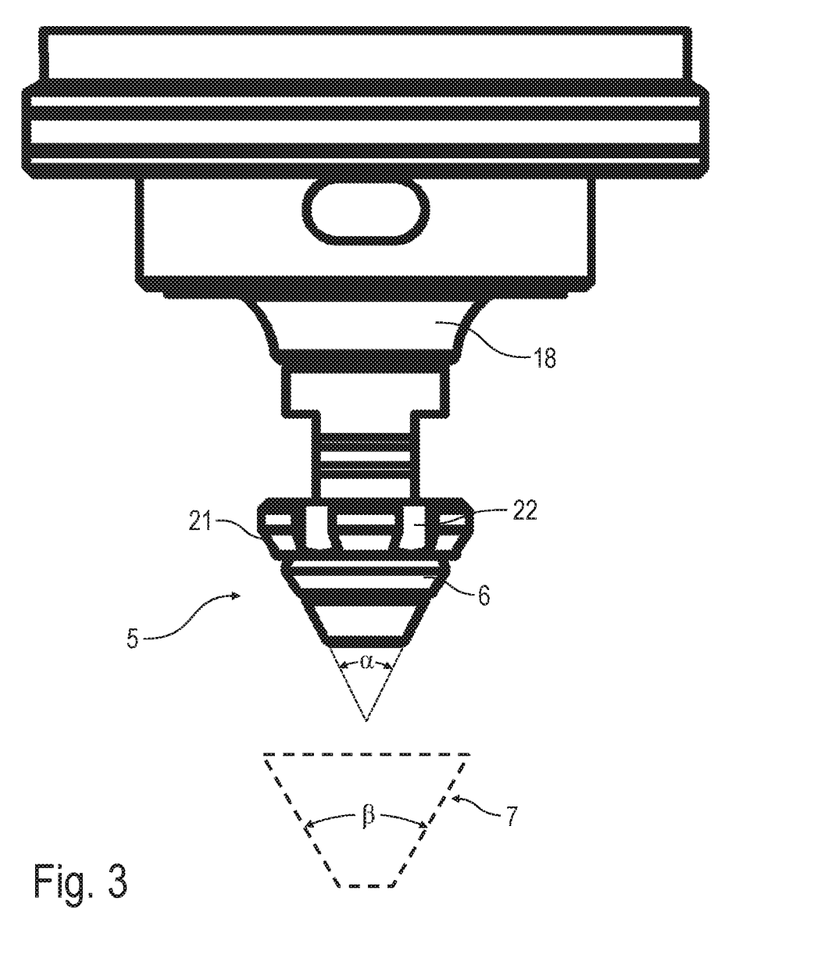
FIG. 3 is a schematic representation of a conical needle head with a conical valve seat.

It can further be seen from FIG. 3 that the needle head 5 tapers in the direction of flow with a head angle $\lambda=35°-50°$, just as the valve seat 7 also tapers conically in the direction of flow with a seat angle $\beta=35°-50°$.

The conical lateral surface of the needle head 5 upstream of the sealing ring 6 forms a supporting surface 21 which, in the closed position according to FIG. 1A, rests on the valve seat 7. The supporting surface 21 forms a stop for the axial movement of the needle head 5 into the closed position. Excessive compression of the sealing ring 6 is thereby prevented, which is beneficial for the life of the sealing ring 6.

The supporting surface 21 is interrupted by a plurality of flushing grooves 22 running axially, which are distributed over the periphery of the needle head 5. In the closed position according to FIG. 1A, the flushing grooves 22 allow flushing medium from the curing agent connection 1 or from the master batch connection 2 to reach the region downstream of the supporting surface 21.

FIGS. 4 to 6D show a metering arrangement for metering coating composition (e.g. paint).

Figure 4:
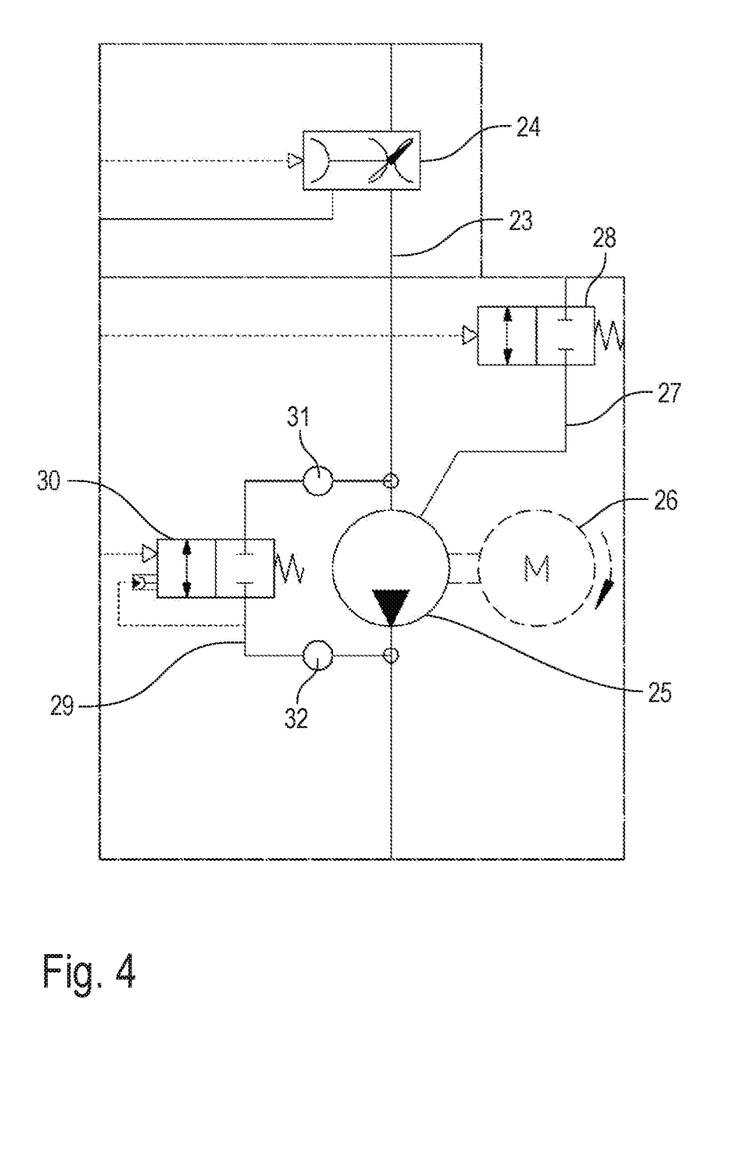
FIG. 4 is a fluidic circuit diagram of a metering arrangement having a paint pressure regulator and a valve unit with a metering pump, a bypass valve and a flushing medium valve.
Figure 5A:
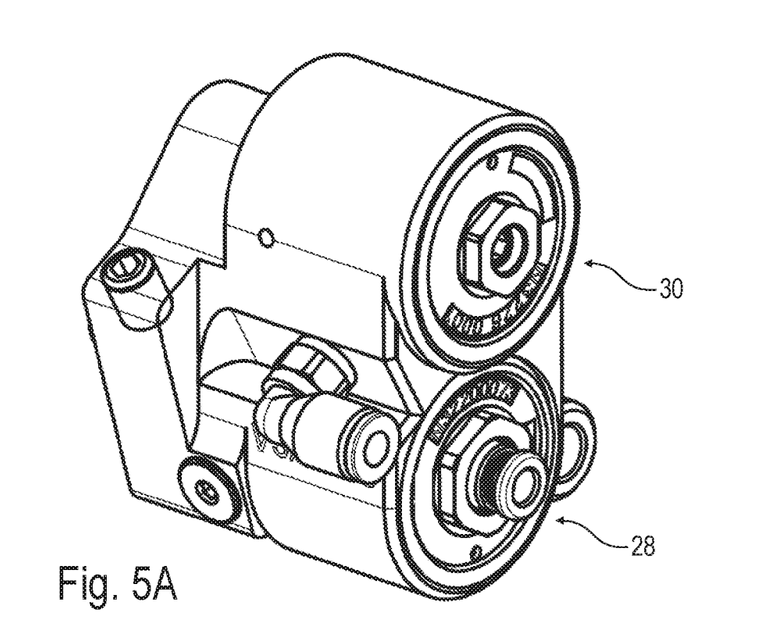
FIG. 5A is a perspective view of the valve unit of FIG. 4.
Figure 5B:
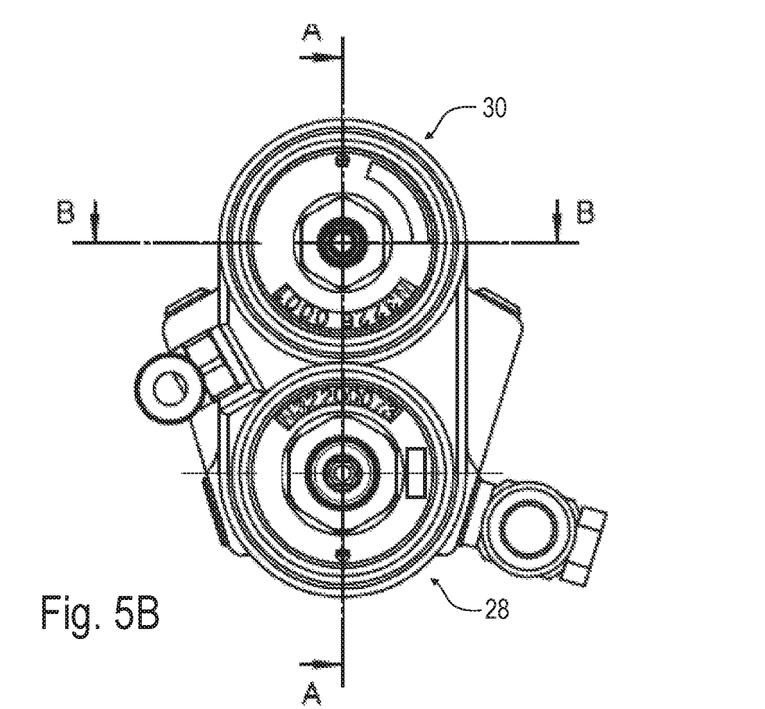
FIG. 5B is a front view of the valve unit of FIG. 5A.
Figure 5C:
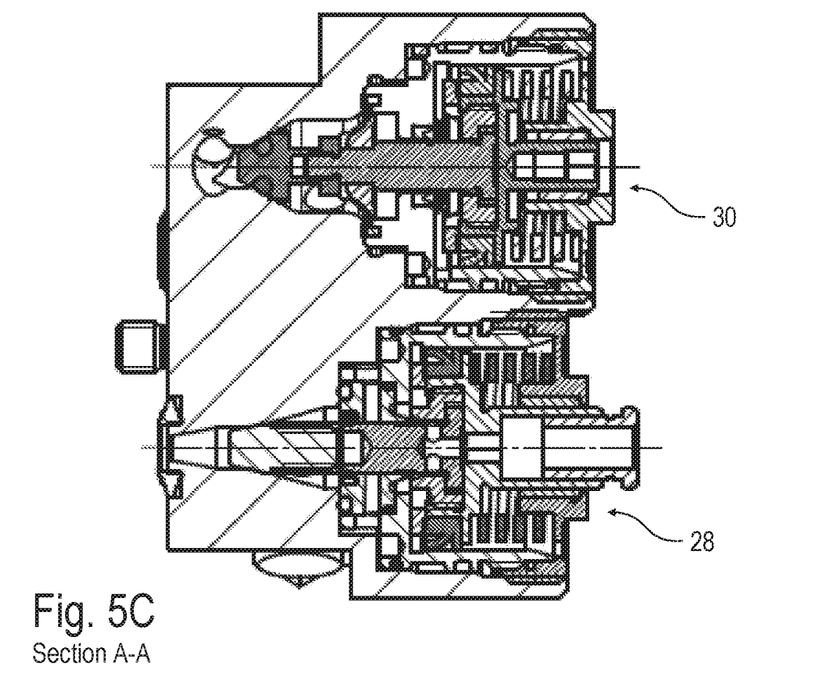
FIG. 5C is a sectional view of the valve unit along cutting line A-A in FIG. 5B.
Figure 5D:
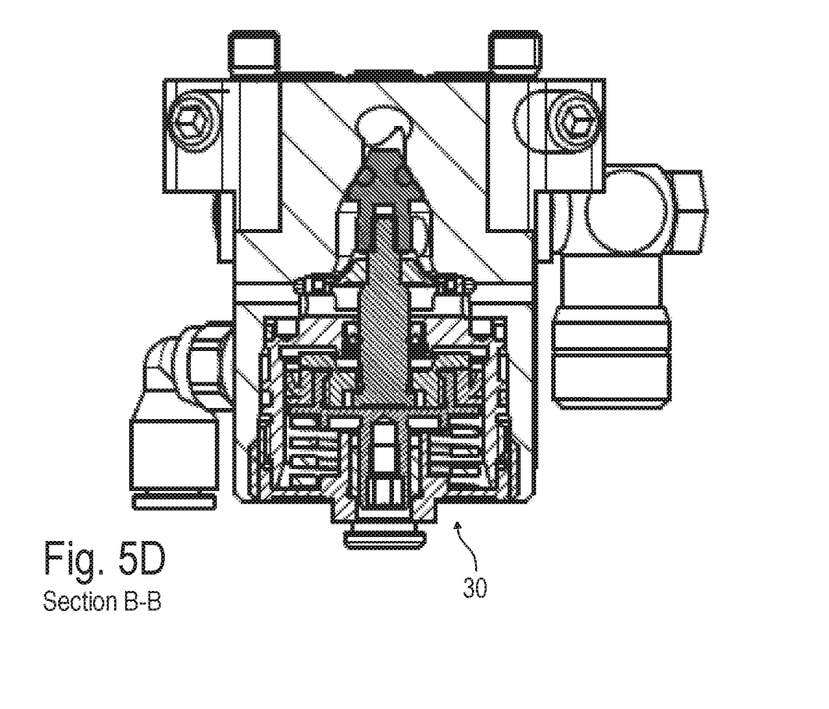
FIG. 5D is a sectional view of the valve unit along cutting line B-B in FIG. 5B.
Figure 5E:
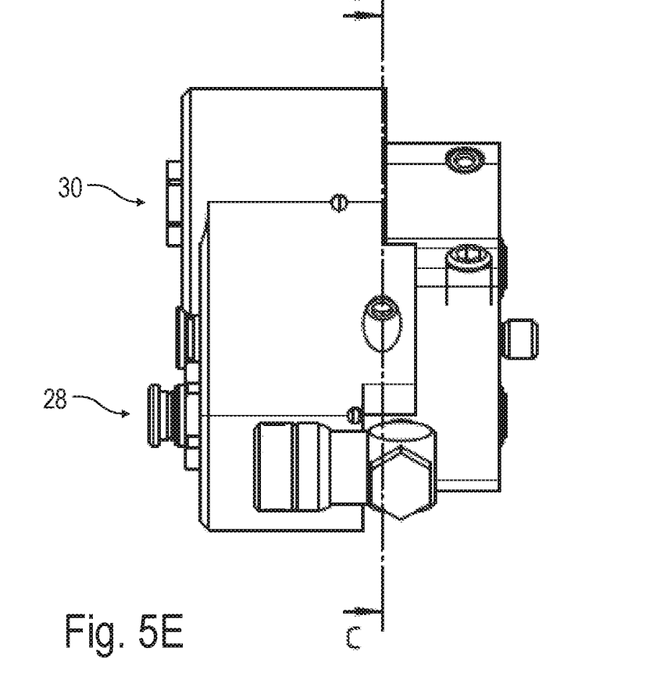
FIG. 5E is a side view of the valve unit of FIGS. 5A-5D.
Figure 5F:
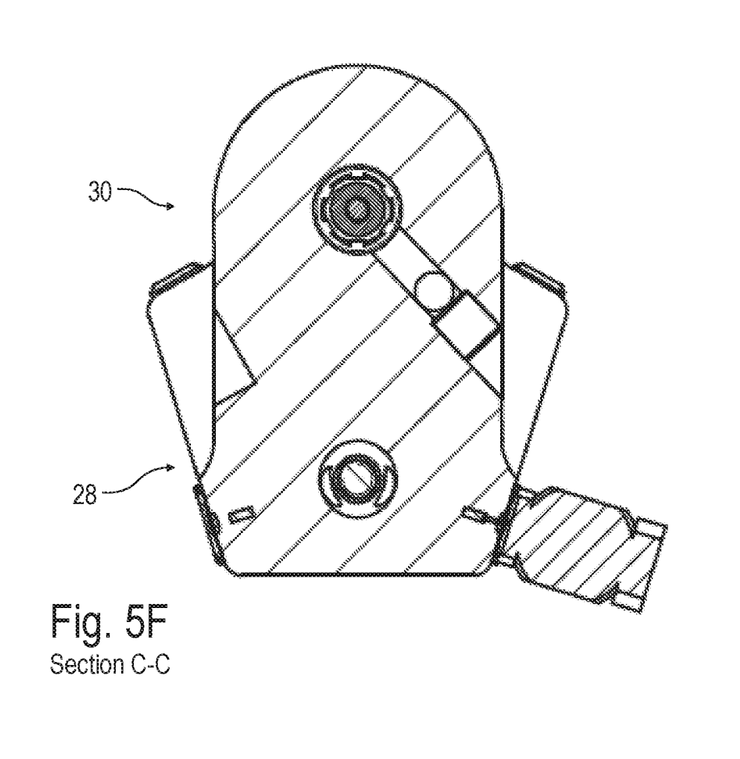
FIG. 5F is a sectional view through the valve unit along cutting line C-C in FIG. 5E.
Figure 6A:
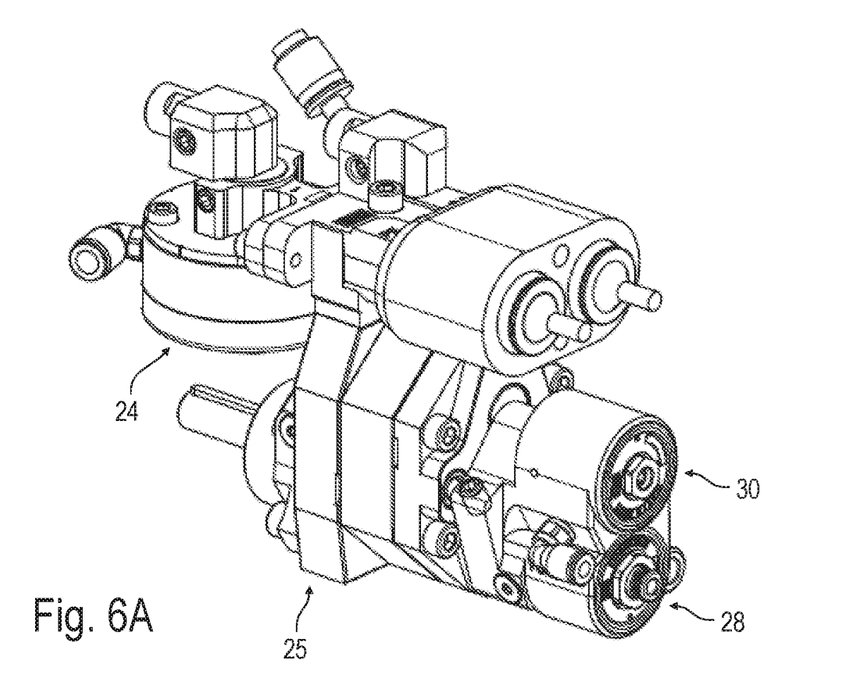
FIG. 6A is a perspective view of the valve unit and of the metering pump with the paint pressure regulator.
Figure 6B:
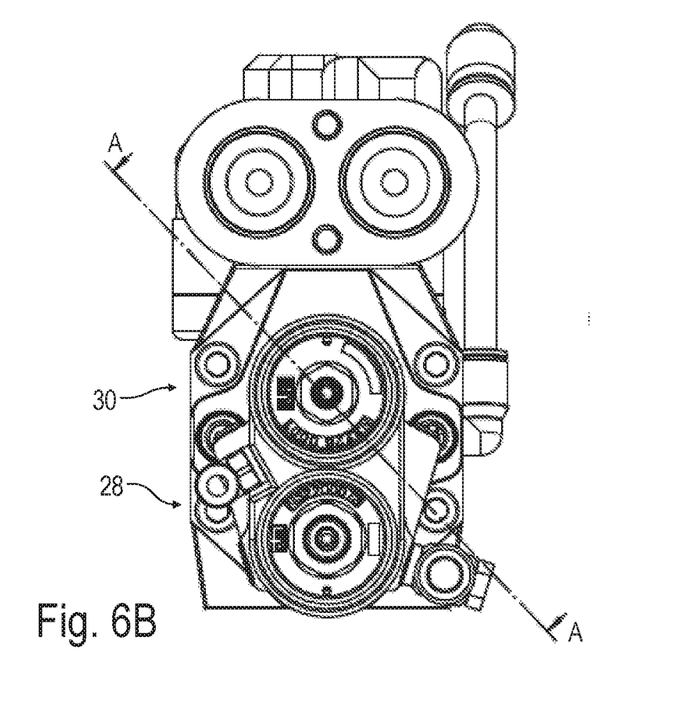
FIG. 6B is a front view of the arrangement of FIG. 6A.
Figure 6C:
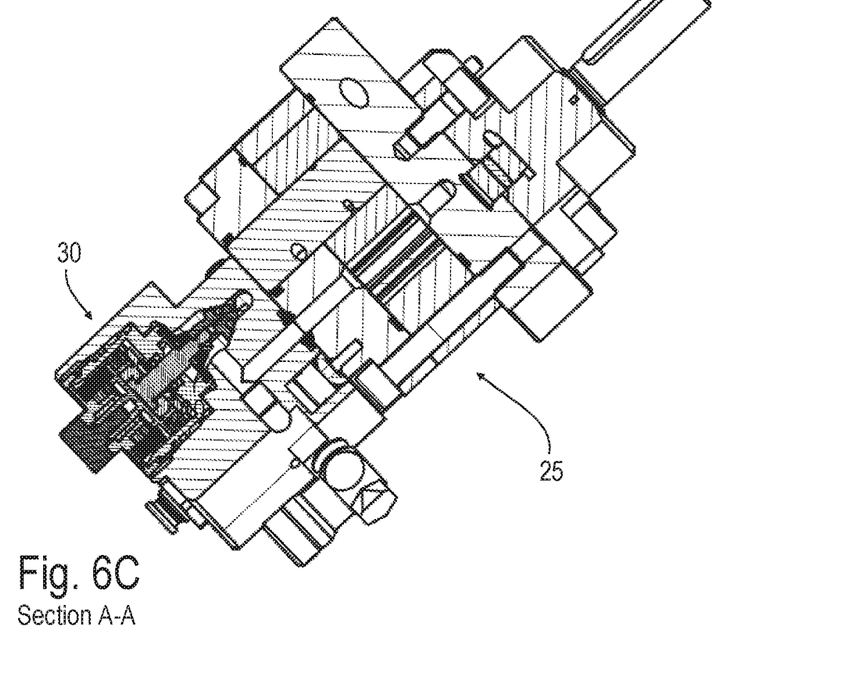
FIG. 6C is a sectional view along cutting line A-A in FIG. 6B.
Figure 6D:
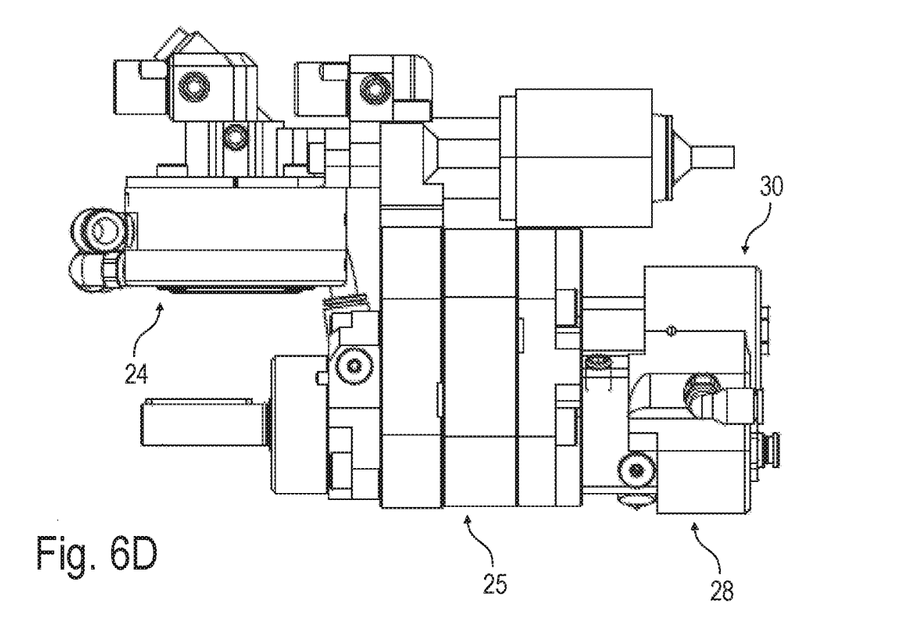
FIG. 6D is a side view of the arrangement of FIGS. 6A-6C.

The coating composition to be metered is supplied through a coating composition line 23 and flows first through a paint pressure regulator 24 and then through a metering pump 25, whereby the paint pressure regulator 24 and the metering pump 25 can be of conventional construction. The metering pump 25 is driven by an electric motor 26, which is likewise known from the prior art.

It should further be mentioned that a flushing medium line 27, via which a flushing medium can be introduced, opens into the metering pump 25.

A controllable flushing medium valve 28 is arranged in the flushing medium line 27.

Parallel to the metering pump 25 there is arranged a bypass line 29 which allows the metering pump 25 to be bypassed, as will be described in detail below.

In the bypass line 29 there is arranged a bypass valve 30 which is able either to block or to free the bypass line 29.

On the one hand, the bypass valve 30 can be actuated by an external control signal. In a normal metering operation, the bypass valve 30 then remains closed. In a flushing operation and when loading the new paint after a paint change, the bypass valve 30 is then opened for a short time by the external control signal. This is advantageous because, as a result of this regular actuation of the bypass valve 30, the operability of the bypass valve 30 can be maintained.

On the other hand, however, the bypass valve 30 also permits overpressure relief if the coating composition pressure at the outlet of the metering pump 25 increases owing to an operating fault. To that end, the metering arrangement has two pressure sensors 31, 32 which measure the coating composition pressure upstream and downstream of the metering pump 25 and are thereby able to detect a pressure increase due to a fault. When such a pressure increase due to a fault is detected, the bypass valve 30 is then controlled by the external control signal.

It should additionally be mentioned, however, that the bypass valve 30 is in the form of a membrane valve. This means that the coating composition pressure upstream after the metering pump 25 acts upon a membrane in the bypass valve 30, so that the bypass valve 30 opens automatically (own-medium-actuated) if the overpressure upstream after the metering pump 25 exceeds a specific maximum value. This own-medium-actuation of the bypass valve 30 is represented in the drawing by the broken line which branches from the bypass line 29 between the pressure sensor 32 and the bypass valve 30 and opens into the control inlet of the bypass valve 30. This automatic overpressure relief also acts if the two pressure sensors 31, 32 have failed or if the external control of the bypass valve 30 is no longer functioning.

It can further be seen from FIGS. 6A to 6D that the valve unit having the flushing medium valve 28 and the bypass valve 30 is arranged in a housing which is flange-mounted on the housing of the metering pump 25. The valve unit having the bypass valve 30 and the flushing medium valve 28, on the one hand, and the metering pump 25, on the other hand, are thus not accommodated in a common housing. This is advantageous because the housing of the valve unit having the flushing medium valve 28 and the bypass valve 30 then does not have to be made of stainless steel, so that the overall costs can be reduced.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. Needle valve for controlling a fluid flow of a coating composition in a coating system, having
   a) a valve seat,
   b) a displaceable valve needle having a needle stem and a needle head,
      b1) wherein the needle head closes the valve seat when the valve needle is in a closed position,
      b2) whereas the needle head frees the valve seat when the valve needle is in an open position,
      b3) wherein the needle stem of the valve needle has a diameter which is greater than 2 mm and smaller than 10 mm, and
      b4) whereas the valve needle has a maximum needle stroke of less than 3 mm, and c) a flexible membrane which surrounds the valve needle upstream of the needle head in an annular and sealing manner.

2. Needle valve according to claim 1, wherein
a) the valve needle is displaceably arranged in a valve chamber, wherein the valve chamber is cylindrical at least in part,
b) the membrane is fixed in a middle to the needle stem of the valve needle in a sealing manner, and
c) the membrane is fixed by its peripheral edge to the inside wall of the valve chamber in a sealing manner.

3. Needle valve according to claim 2, further comprising:
a) a valve drive for displacing the valve needle,
b) a coating composition inlet for supplying the coating composition, wherein the coating composition inlet opens into the valve chamber on the side of the membrane remote from the valve drive, so that the membrane seals the valve drive with respect to the valve chamber filled with coating composition, and
c) a coating composition outlet for discharging the coating composition, wherein the coating composition outlet opens into the valve seat so that, when the valve needle is in the open position, the coating composition is able to flow through the valve seat to the coating composition outlet.

4. Needle valve according to claim 3, wherein the valve drive has the following:
a) a displaceable piston which acts upon the valve needle in order to displace the valve needle,
b) a control air inlet for supplying control air, wherein the control air acts upon the piston in order to displace the piston and thus also the valve needle,
c) a valve spring which acts upon the piston or the valve needle with a spring force.

5. Needle valve according to claim 4, wherein the spring force of the valve spring in the closed position and in the open position is at least 20 N and not more than 400 N.

6. Needle valve according to claim 4, wherein
a) the valve spring pushes the valve needle in the direction towards the closed position, and
b) the control air pushes the valve needle, via the piston, in the direction towards the open position.

7. Needle valve according to claim 6, wherein the valve spring and the needle head are arranged on opposite sides of the piston.

8. Needle valve according to claim 7, wherein the piston has a piston diameter of at least 5 mm in order to generate a great opening force when the valve needle moves into the open position.

9. Needle valve according to claim 8, wherein the control air requires a control air pressure of less than 6 bar, to move the valve needle into the open position, so that the control air can be obtained from a conventional 6-bar compressed air network.

10. Needle valve according to claim 6, wherein
a) the valve spring pushes the valve needle in the direction towards the closed position with a specific closing force,
b) the pneumatic valve drive, when pneumatically actuated, pushes the valve needle in the direction towards the open position with a specific opening force,
c) the opening force is greater by a specific opening force excess than the closing force, so as to be able to open the needle valve if the needle head adheres to the valve seat.

11. Needle valve according to claim 10, wherein the opening force excess is greater than 20N.

12. Needle valve according to claim 10, wherein the opening force excess is greater than 80N.

13. Needle valve according to claim 10, wherein the opening force excess is greater than 120 N.

14. Needle valve according to claim 4, wherein
a) above a specific opening pressure, the coating composition pressure at the coating composition inlet pushes the valve needle, via the membrane, out of the closed position into the open position,
b) the membrane has a membrane diameter of at least 3 mm and not more than 40 mm,
c) the opening pressure of the coating composition at the coating composition inlet is at least 8 bar and not more than 35 bar.

15. Needle valve according to claim 1, wherein
a) the valve seat narrows in the direction of flow with a specific seat angle,
b) the needle head narrows in the direction of flow with a specific head angle,
c) the seat angle is substantially equal to the head angle.

16. Needle valve according to claim 15, wherein
a) the seat angle is greater than 20° and smaller than 70°,
b) the head angle is greater than 20° and smaller than 70°.

17. Needle valve according to claim 1, wherein an additional sealing element is installed in the needle head of the valve needle in order to seal the valve seat in the closed position.

18. Needle valve according to claim 17, wherein the sealing element is made of a different material than the needle head of the valve needle.

19. Needle valve according to claim 18, wherein the sealing element is made of a resilient material.

20. Needle valve according to claim 19, wherein the sealing element is made of perfluoro rubber.

21. Needle valve according to claim 20, wherein the sealing element is moulded onto the needle head.

22. Needle valve according to claim 21, wherein the sealing element is a sealing ring which is installed in an annular groove in the needle head.

23. Needle valve according to claim 22, wherein the needle head is made of titanium.

24. Needle valve according to claim 17, wherein
a) the needle head of the valve needle tapers substantially conically in the direction of flow,
b) the valve seat tapers substantially conically in the direction of flow,
c) the needle head has in its conical lateral surface an annular groove in which the sealing element is installed,
d) the conical lateral surface of the needle head forms an annular peripheral supporting surface upstream of the sealing element and rests with the supporting surface on the valve seat,
e) the needle head has in the supporting surface at least one flushing groove running axially which, when the valve needle is in the closed position, allows flushing medium to pass from the valve chamber to the sealing element.

25. Needle valve according to claim 24, wherein the flushing groove has a groove width of at least 1 mm and not more than 2 mm.

26. Needle valve according to claim 24, wherein
a) the needle head has a rigid stop and, in the closed position, rests with the stop on the valve seat, and
b) when the valve needle is in the closed position, the sealing element in the needle head is exposed to a pressure which is independent of the closing force acting upon the valve needle, since the needle head is resting with its rigid stop on the valve seat.

27. Needle valve according to claim 1, wherein the curing agent comprises isocyanate.

28. Needle valve for controlling a fluid flow of a coating composition in a coating system, having
 a) a valve seat that tapers substantially conically in a direction of flow,
 b) a displaceable valve needle having a needle stem, a needle head, and a sealing element installed in the needle head of the valve needle to seal the valve seat in a closed position,
  b1) wherein the needle head closes the valve seat when the valve needle is in the closed position,
  b2) whereas the needle head frees the valve seat when the valve needle is in an open position,
  b3) wherein the needle head of the valve needle includes a conical lateral surface that tapers substantially conically in the direction of flow,
  b4) wherein the conical lateral surface of the needle head includes an annular groove in which the sealing element is installed,
  b5) wherein the conical lateral surface of the needle head forms an annular peripheral supporting surface upstream of the sealing element and rests with the supporting surface on the valve seat, and
  b6) wherein the needle head has in the supporting surface at least one flushing groove running axially which, when the valve needle is in the closed position, allows flushing medium to pass from the valve chamber to the sealing element, and
 c) a flexible membrane which surrounds the valve needle upstream of the needle head in an annular and sealing manner.

* * * * *